United States Patent
Katayama et al.

(10) Patent No.: US 6,460,338 B1
(45) Date of Patent: Oct. 8, 2002

(54) ABSORPTION WASTE-HEAT RECOVERY SYSTEM

(75) Inventors: Masatoshi Katayama; Takafumi Origane, both of Kyoto; Kenji Matsuda, Amagasaki, all of (JP)

(73) Assignee: Takuma Co., Ltd., Osaka (JP)

( * ) Notice: Subject to any disclaimer, the term of this patent is extended or adjusted under 35 U.S.C. 154(b) by 0 days.

(21) Appl. No.: 09/994,093

(22) Filed: Nov. 26, 2001

(30) Foreign Application Priority Data

Nov. 27, 2000 (JP) ........................ 2000-359036

(51) Int. Cl.$^7$ .............................. F01K 25/08

(52) U.S. Cl. .............. 60/651; 60/673; 60/676

(58) Field of Search .............. 60/649, 651, 671, 60/673, 676

(56) References Cited

U.S. PATENT DOCUMENTS

| | | | | |
|---|---|---|---|---|
| 4,407,131 A | * | 10/1983 | Wilkinson | 60/648 |
| 5,218,843 A | * | 6/1993 | Dao | 62/476 |
| 5,555,731 A | * | 9/1996 | Rosenblatt | 60/671 |
| 6,170,263 B1 | * | 1/2001 | Chow et al. | 60/649 |

FOREIGN PATENT DOCUMENTS

JP 11304274 11/1999

* cited by examiner

*Primary Examiner*—Hoang Nguyen
(74) *Attorney, Agent, or Firm*—Webb Ziesenheim Logsdon Orkin & Hanson, P.C.

(57) ABSTRACT

An absorption waste-heat recovery system includes a high temperature generator for directly receiving a heat medium fluid containing waste heat for recovering heat therefrom and concentrating a solution having an absorbent dissolved therein and generating steam, a low temperature generator for re-concentrating the concentrated solution after reduction of its temperature by heat recovering means in the system by using the steam from the high temperature generator as heat source, an auxiliary generator for introducing the heat medium fluid after its heat recovery at the high temperature generator and again recovering heat therefrom, a condenser capable of condensing steam from the auxiliary generator and steam after the re-concentration of the concentrated solution at the low temperature generator, an evaporator for evaporating the condensed water condensed at the condenser, and an absorber for receiving the concentrated solution from the low temperature generator and the concentrated solution from the auxiliary generator and diluting these solutions by causing them to absorb the steam from the evaporator. A double-effect cycle using the high temperature generator and the low temperature generator and a single-effect cycle using the auxiliary generator share at least the evaporator and the absorber out of the condenser, the evaporator and the absorber.

2 Claims, 3 Drawing Sheets

ABSORPTION WASTE-HEAT RECOVERY SYSTEM

BACKGROUND OF THE INVENTION

1. Field of the Invention

The present invention relates to an absorption waste-heat recovery system including a generator for recovering heat by receiving heat medium fluid containing waste heat and concentrating a solution with absorbent dissolved therein and generating steam, a condenser capable of condensing the steam generated from the generator, an evaporator operable to evaporate condensed water condensed by the condenser and an absorber operable to dilute the concentrated solution concentrated by the generator by causing the solution to absorb the steam from the evaporator.

2. Description of the Related Art

In the absorption waste-heat recovery system described above, there is provided an absorption cold/hot water producing apparatus including the generator for concentrating solution with absorbent dissolved therein into a concentrated solution and generating steam, the condenser capable of condensing the steam generated by the generator, the evaporator operable to evaporate condensed water condensed by the condenser and the absorber operable to dilute the concentrated solution concentrated by the generator by causing the solution to absorb the steam generated from the evaporator. In operation, by inputting heat medium fluid containing waste heat to the generator, the system recovers heat in the form of concentration heat of the diluted solution.

With the absorption cold/hot water producing apparatus described above, for production of cold water, steam obtained by concentration-separation at the generator is condensed by the condenser and this condensed water is supplied to the evaporator, in which the condensed water is caused to contact a heat exchanger tube adapted for producing cold water thereby to absorb latent heat of evaporation, so that the water inside the heat exchanger tube is cooled. The generated steam is guided to the absorber to be absorbed into the concentrated solution therein, whereby the concentrated solution concentrated by the generator is diluted. This diluted solution which has been diluted and heated also is cooled inside the absorber and then returned to the generator. On the other hand, for production of warm water, in many cases, the heat contained in the steam heated by the generator and in the concentrated solution is used directly for the purpose of hot water production.

With the absorption waste-heat recovery system having the above-described conventional construction, in order to improve its heat recovery efficiency, the system often employs a double-effect cycle involving two generators, one being a high temperature generator and the other being a low temperature generator. However, it is difficult for the high temperature generator to recover the heat contained in the heat medium fluid sufficiently. Hence, there has been a desire for further improvement in heat recovery efficiency. More particularly, for example, exhaust gas from a heat-electricity co-generating plant generally has a temperature of 200 to 300° C. and the diluted solution introduced to the high temperature generator has a temperature of about 150 to 155° C. after being pre-heated through heat exchange reaction with the heated concentrated solution. Therefore, there exists the problem of inability to recover the heat of the exhaust gas sufficiently.

Then, in an attempt to improve this heat recovery efficiency, as known from Japanese laid-open patent application gazette No. Hei. 11-304274 for example, there has been proposed to provide the absorption heat recovery system with still another generator, i.e. an auxiliary heat generator, so that the heat medium fluid after heat recovery by the high temperature generator is introduced to this auxiliary heat generator for further recovery of heat therefrom. In the case of the invention described in the above-identified laid-open gazette, this invention utilizes the reverse flow in order to take advantage of the fact that the steam separated by the high temperature generator has a higher temperature than the concentrated solution after the heat recovery by the auxiliary generator. More particularly, an auxiliary low temperature generator is provided for receiving the concentrated solution from the auxiliary generator and this solution is then separated by the high temperature generator and heated with steam and condensed again. That is, the construction employs the double-effect cycle with heat currents crossing each other. And, for production of hot water with this system, the evaporator is deactivated, so that the cooling water running in a cooling tube of the absorber is taken out as hot or warm water.

More particularly, the diluted solution is fed to the auxiliary generator, where the solution is concentrated. And, this concentrated solution is fed to the low temperature generator. A portion of this concentrated solution concentrated by the low temperature generator is fed to the high temperature generator. On the other hand, the concentrated solution fed to the low temperature generator is heated with steam separated by the high temperature generator. Further, the concentrated solution re-concentrated at the high temperature generator is used for preheating a portion of the concentrated solution from the low temperature generator and then fed to the absorber together the remaining portion of the concentrated solution from the low temperature generator. The steam separated at the high temperature generator and having heated the concentrated solution at the low temperature generator, the steam separated at the low temperature generator and the steam separated at the auxiliary generator are guided to the condenser to be cooled and condensed thereat. Condensed water condensed from the steam at the condenser is evaporated at the evaporator, thereby to absorb latent heat of evaporation, thus producing cold water. The concentrated solution concentrated at the high temperature generator and the remaining portion of the concentrated solution concentrated at the low temperature generator are together guided to the absorber to absorb the steam evaporated at the evaporator, so that the resultant heat of absorption heats the cooling water. Here, if the low temperature generator guides the steam from the high temperature generator after heating the concentrated solution from the auxiliary generator directly to the evaporator via a bypass passage, this steam together with the steam from the auxiliary generator and the steam from the low temperature generator are guided to the evaporator, so that warm water may be produced.

As described above, with the invention disclosed by the above-identified laid-open patent application gazette, the cycle is very complicated. And, the heat source represented by a combustion device such as an internal combustion engine will experience variation in the heat amount contained in its exhaust gas containing the waste heat, in association with load variation. In order to allow the concentrated solution and steam to flow from the generators through the respective components to the absorber in accordance with a pressure which is gradually reduced in association with heat exchange reactions between the concentrated solution and the steam, it is necessary to adjust the circulation amount of the solution containing absorbent dissolved therein and also to adjust its pressure relationship. In particular, in the case of the low temperature generator, the concentrated solution from the auxiliary generator is heated with the steam from the high temperature generator. Then, when variations occur in the amount of exhaust gas and its temperature, it is extremely difficult to control the balance between the temperature of the solution to be heated and the heating steam at least at the low temperature generator. This will lead inevitably to complexity in a control mechanism therefor. If the temperature balance is lost, this will lead also to change in the pressure relationship, thus inviting reduction in the output from the heat recovery system. In this way, because of mutual interference present between the high temperature generator and the auxiliary generator, it is believed that the invention of the above-described gazette suffers the problem of extreme difficulty in control conditions and complexity in the controlling system therefor.

SUMMARY OF THE INVENTION

In view of the above, a primary object of the present invention is to provide an absorption waste-heat recovery system which effects heat recovery in two steps and which employs an efficient heat recovery cycle utilizing, in combination, a double-effect cycle in which an absorbent has a high saturation temperature and a single-effect cycle in which the absorbent has a relatively low saturation temperature, for greater heat recovery efficiency as well as for greater simplicity of the system construction.

For accomplishing the above-noted object, according to the first feature of the present invention, an absorption waste-heat recovery system comprises:

- a high temperature generator for directly receiving a heat medium fluid containing waste heat for recovering heat therefrom and concentrating a solution having an absorbent dissolved therein and generating steam;
- a low temperature generator for re-concentrating the concentrated solution concentrated at the high temperature generator after reduction of its temperature by heat recovering means in the system by using the steam from the high temperature generator as heat source;
- an auxiliary generator for introducing the heat medium fluid after its heat recovery at the high temperature generator and again recovering heat therefrom;
- a condenser capable of condensing steam from the auxiliary generator and steam after the re-concentration of the concentrated solution at the low temperature generator;
- an evaporator for evaporating the condensed water condensed at the condenser; and
- an absorber for receiving the concentrated solution from the low temperature generator and the concentrated solution from the auxiliary generator and diluting these solutions by causing them to absorb the steam from the evaporator;
- wherein a double-effect cycle using the high temperature generator and the low temperature generator and a single-effect cycle using the auxiliary generator share at least the evaporator and the absorber out of the condenser, the evaporator and the absorber.

With the absorbent waste-heat recovery system having the above-described construction, the system is adapted for recovering heat in the two stages, i.e. at the high temperature generator and at the auxiliary generator. Further, the concentrated solution separated at the high temperature generator and the concentrated solution separated at the auxiliary generator are supplied respectively to the absorber via passages thermally insulated from each other. And, the steam separated at the high temperature generator and the steam separated at the auxiliary generator are also supplied respectively to the condenser via passages thermally insulated from each other.

With the above construction of the present invention, by using the double-effect cycle and the single-effect cycle in combination and recovering heat from the heat medium fluid in the two stages of the high temperature generator and the auxiliary generator, the heat contained in the heat medium fluid may be recovered with high efficiency and the control mechanism may be simplified. Moreover, the heat recovered at the high temperature generator and the heat recovered at the low temperature generator acting as heat input units respectively for the double-effect cycle and the single-effect cycle which cycles share at least the evaporator and the absorber out of the condenser, the evaporator and the absorber are not exchanged with each other between the steam and concentrated solution from the high temperature generator containing the former heat and the steam and concentrated solution from the auxiliary generator containing the latter heat. Rather, these steams are supplied respectively to the condenser and the concentrated solutions are supplied respectively to the absorber. Hence, there occurs substantially no interference between the double-effect cycle and the single-effect cycle. As a result, it becomes possible to carry out the control of the circulation amount of diluted solution to the high temperature generator and the control of the circulation amount of diluted solution to the auxiliary generator substantially independently of each other. That is, the steams separated respectively at the high temperature generator and the auxiliary generator are supplied to the condenser via thermally insulated respective passages and also the concentrated solutions separated at the high temperature generator and the auxiliary generator are also supplied to the absorber via thermally insulated respective passages. With these arrangements, even if there occurs a change which may disturb the favorable balance between the heat recovery amount at the high temperature generator and the heat recovery amount at the auxiliary generator, this can be coped with simply by adjusting the circulation amounts of the diluted solutions to the respective generators.

According to the second feature of the present invention, in the system described above, the system further comprises bypass passages for connecting a steam passage from the high temperature generator, a steam passage from the auxiliary generator, a concentrated solution passage from the high temperature generator and a concentrated solution passage from the auxiliary generator respectively via circuit closing means to the absorber, so that by opening the bypass passage with manipulation of the circuit closing means the absorber or the evaporator produces hot water.

With this second feature of the invention, in addition to the function and effect by the first feature, hot or warm water can be readily produced by the system. That is, owing to the inclusion of the bypass passages for connecting a steam passage from the high temperature generator, a steam passage from the auxiliary generator, a concentrated solution passage from the high temperature generator and a concentrated solution passage from the auxiliary generator respectively via circuit closing means to the absorber, if the circuit closing means is opened, the bypass passages are opened up. As a result, all terminal pressures of the steam passage and the concentrated solution passage from the high temperature generator and the steam passage and the concentrated solution passage from the auxiliary generator become equal to a pressure inside the absorber. which would be at its minimum if the bypass passage were closed. Accordingly, substantially all of the concentrated solutions and the steams will flow into the absorber through the respective bypass passages. Consequently, hot or warn water may be produced at a cooling pipe included in the absorber. Alternatively, by transferring its heat to the evaporator, hot or warn water may be produced at the heat exchanger tube included in the evaporator.

Further and other features and advantages of the invention will become apparent from the following detailed description of preferred embodiments thereof with reference to the accompanying drawings.

DESCRIPTION OF THE PREFERRED EMBODIMENTS

Preferred embodiments of an absorption waste-heat recovery system relating to the present invention will be described next with reference to the accompanying drawings.

Figure 1:
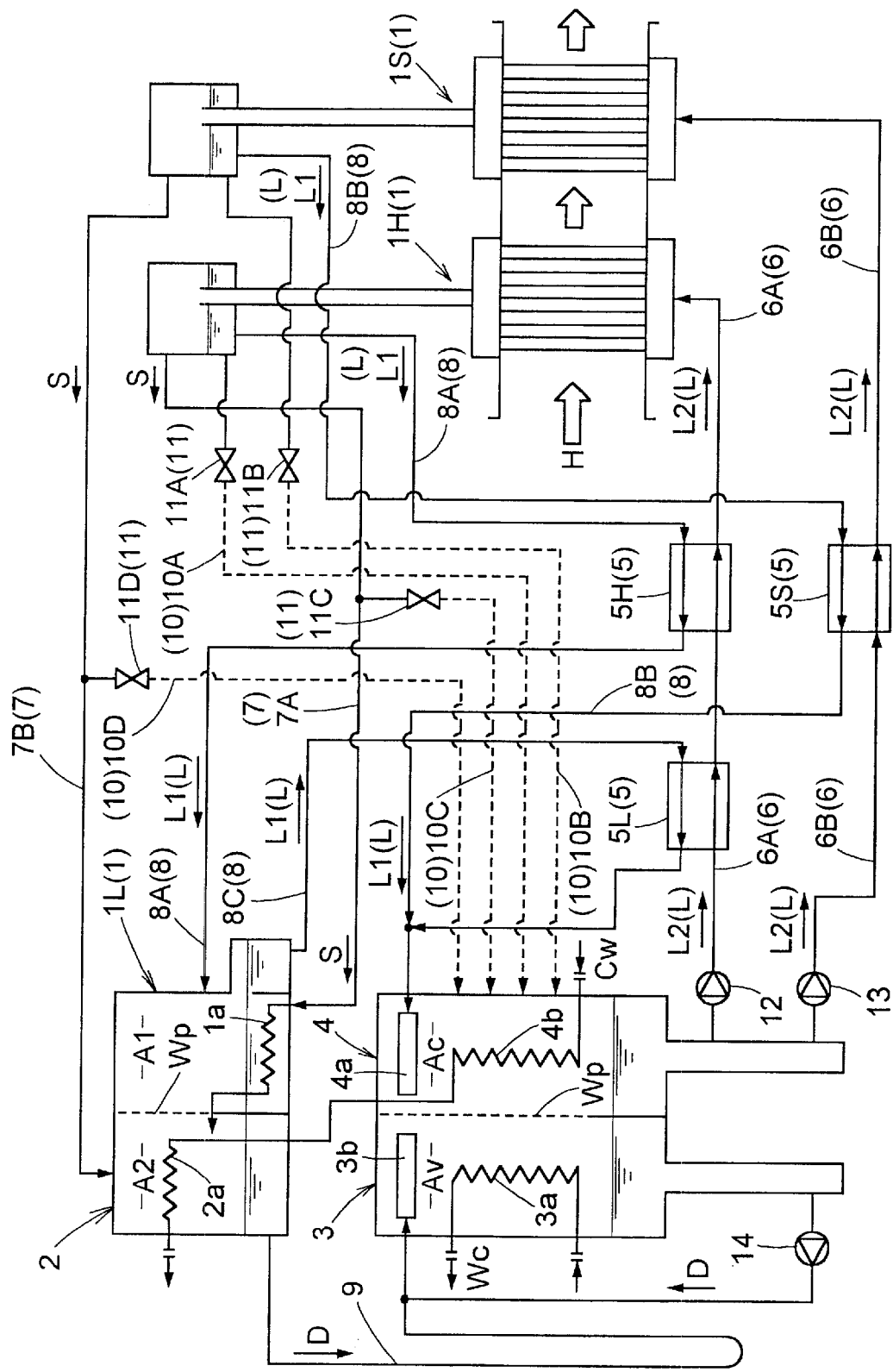
FIG. 1 is an explanatory view showing a construction of an absorption waste-heat recovery system according to one preferred embodiment of the present invention.

As shown in FIG. 1, with an absorption waste-heat recovery system according to one preferred embodiment of the present invention, as a generator 1 for receiving heat medium fluid H containing waste heat for recovering heat therefrom and concentrating diluted solution L2 having an absorbent dissolved therein and supplied from a diluted liquid passage 6 and generating steam S, there are provided a high temperature generator 1H, a low temperature generator 1L and an auxiliary generator 1S. The high temperature generator 1H directly receives the heat medium fluid H. The auxiliary generator IS receives the heat medium fluid H after the heat recovery therefrom at the high temperature generator 1H and again recovers heat therefrom. And, the low temperature generator 1L receives concentrated solution L1 obtained after concentration of the solution L at the high temperature generator 1H and reduction of its temperature at a heat recovering means 5 provided in the system subsequent thereto and concentrates again this concentrated solution L1.

The high temperature generator 1H, the low temperature generator 1L, a condenser 2 capable of condensing the steam S separated at the low temperature generator 1L, an evaporator 3 for evaporating a condensed water D condensed at the condenser 2, and an absorber 4 for diluting the concentrated solution L1 concentrated at the low temperature generator 1L by causing it to absorb the steam from the evaporator 3 together constitute a double-effect cycle. On the other hand, the steam S separated at the auxiliary generator 1S is supplied to the condenser 2 and the concentrated solution L1 concentrated at the auxiliary generator 1S is supplied to the absorber 4. The condensed water D condensed at the condenser 2 is supplied to the evaporator 3 to be evaporated thereat and the concentrated solution L1 is diluted by causing it to absorb the steam from the evaporator 3 at the absorber 4. The auxiliary generator IS, the condenser 2, the evaporator 3 and the absorber 4 together constitute a single-effect cycle. Hence, the double-effect cycle constituted by the high temperature generator 1H directly receiving the heat medium fluid H as heat source and the low temperature generator 1L and the single-effect cycle constituted by the auxiliary generator 1S receiving the heat medium fluid H after the heat recovery therefrom at the high temperature generator 1H as heat source share at last the condenser 2 and the evaporator 3 out of the condenser 2, the evaporator 3 and the absorber 4.

More particularly, to the bottom of the absorber 4, there are connected one ends of a first diluted liquid passage 6A and a second diluted liquid passage 6B together constituting the diluted liquid passage 6. And, the other end of the first diluted liquid passage 6A is connected to the bottom of the high temperature generator 1H, whereas the other end of the second diluted liquid passage 6B is connected to the bottom of the auxiliary generator 1S. A part of the diluted solution L2 diluted by absorption of the steam S at the absorber 4 is supplied, by means of a first supply pump 12 incorporated in the first diluted liquid passage 6A, to the high temperature generator 1H via a low temperature heat exchanger 5L and a high temperature heat exchanger 5H. And, the remaining part of the diluted solution L2 is supplied, by a second supply pump 13 incorporated in the second diluted liquid passage 6B, to the auxiliary generator 1S via an auxiliary heat exchanger 5S. These diluted solution L2 parts are heated respectively at heating sections of the high temperature heat exchanger 5H and the auxiliary generator 1S with the heat of the heat medium fluid H containing waste heat to be concentrated thereby and to generate steams S. These steams S are separated from the concentrated solution L1 at respective gas-liquid separating sections.

Of steam passages 7 for guiding the separated steams S to these steam generating or evaporating spaces, a first steam passage 7A for guiding the steam S from the high temperature generator 1H is connected to a heating passage 1a of the low temperature generator 1L; and a second steam passage 7B for guiding the steam from the auxiliary generator 1S is connected to the condenser 2. The second steam passage 7B and the heating passage 1a of the low temperature generator 1L are opened into a gas phase space A2 of the condenser 2. In the illustrated construction, the low-temperature generator 1L and the condenser 2 are combined as an assembly and a gas phase space A1 of the low temperature generator 1L and the gas phase space A2 of the condenser 2 are partitioned from each other by means of an eliminator Wp which comprises a gas-permeable partitioning wall. This construction provides the advantages of eliminating an additional steam passage for guiding the steam separated at the low temperature generator 1L to the condenser 2 and of maintaining favorable pressure balance between the two gas phase spaces A1, A2.

A condensed water passage 9 for guiding the condensed water D condensed at the condenser 2 to the evaporator 3 is connected to a shower nozzle 3b of the evaporator 3. Then, the condensed water D is caused to flow down onto a heat exchanger tube 3a disposed within an evaporating space Av inside the evaporator 3, so that the water D is evaporated under a reduced pressure and cools cooling water Wc inside the heat exchanger tube 3a. The condensed water D accumulated at the bottom of the evaporator 3 is returned to the condensed water passage 9 by means of a return pump 14.

On the other hand, of concentrated solution passages 8 for guiding the concentrated solution L1, a first concentrated solution passage 8A for guiding the concentrated solution L1 concentrated at the high temperature generator 1H is connected via the high temperature heat exchanger 5H to the low temperature generator 1L. A re-concentrated solution passage 8C for guiding the re-concentrated solution L1 re-concentrated at the low-temperature generator 1L is connected via the low temperature heat exchanger 5L to the absorber 4. Further, a second concentrated solution passage 8B for guiding the concentrated solution L1 concentrated at the auxiliary generator 1S is combined via the auxiliary heat exchanger 5S with the re-concentrated solution passage 8C and connected together to the absorber 4. With these, the concentrated solution L1 re-concentrated at the low temperature generator 1L and the concentrated solution L1 concentrated at the high temperature generator 1H respectively preheat the diluted solution L2 of the first diluted liquid passage 6A to be supplied to the high temperature generator 1H. Whereas, the concentrated solution L1 concentrated at the auxiliary generator 1S preheats the diluted solution L2 of the second diluted solution passage 6B to be supplied to the auxiliary generator 1S.

The absorber 4 includes a concentrated liquid nozzle 4a for discharging the concentrated solution L1 downwardly toward a contact space Ac formed within the vessel body of the absorber and a cooling tube 4b for cooling the solution L discharged downward from the concentrated liquid nozzle 4a, so that the absorber absorbs heat from the diluted solution L2 which has absorbed the steam S evaporated at the evaporator 3 and has been heated thereby. The cooling water Wc supplied to the cooling tube 4b absorbs heat at the contacting space Ac and then is supplied to a cooling heat exchanger tube 2a mounted in the condenser 2. At a lower region of the absorber 4, there is formed a diluted liquid sump, from which the diluted solution L2 parts are supplied by the first and second supply pumps 12, 13 respectively via the first diluted liquid passage 6A and the second diluted liquid passage 6B to the heating units of the high temperature generator 1H and the auxiliary generator 1S, as described hereinbefore. In the illustrated construction, the evaporator 3 and the absorber 4 are combined as an assembly and an evaporating space Av of the evaporator 3 and the contact space Ac of the absorber 4 are partitioned from each other by means of an eliminator Wp which comprises a gas-permeable partitioning wall. This construction provides the advantages of eliminating an additional steam passage for guiding the steam separated at the evaporator 3 to the absorber 4. The construction provides another advantage of not providing ventilation resistance which would interfere with the steam current which flows at an extremely high rate, so that the pressure balance between the evaporating space Av and the contact space Ac may be maintained favorably.

With the above-described construction in operation, the high temperature generator 1H and the auxiliary generator 1S recovers the waste heat contained in the heat medium fluid H and heats and concentrates the diluted solution L2, and as the steam S and the concentrated solution L1 separated from each other are circulated in the system, the cooling water Wc circulating in the heat exchanger tube 3a of the evaporator 3 is cooled. In this way, there is established a system for producing cooling water by utilizing waste heat. In the above, the circulations of the concentrated solution L1 and the steam S are realized by the respective supply pumps and pressure differences between the vessel-like components of the system. And, the pressures inside the respective vessel-like components depend on the temperatures inside the same. In this regard, although the double-effect cycle inputting heat by the high temperature generator 1H and the single-effect cycle inputting heat by the auxiliary generator 1S share the condenser 2 and the absorber 4, there occurs no heat exchange in the respective cycle between the steam passage from the generator to the condenser and the concentrated solution passage from the generator to the absorber. Therefore, in spite of the common use of the condenser and the absorber, these cycles can be controlled substantially independently of each other.

Figure 2:
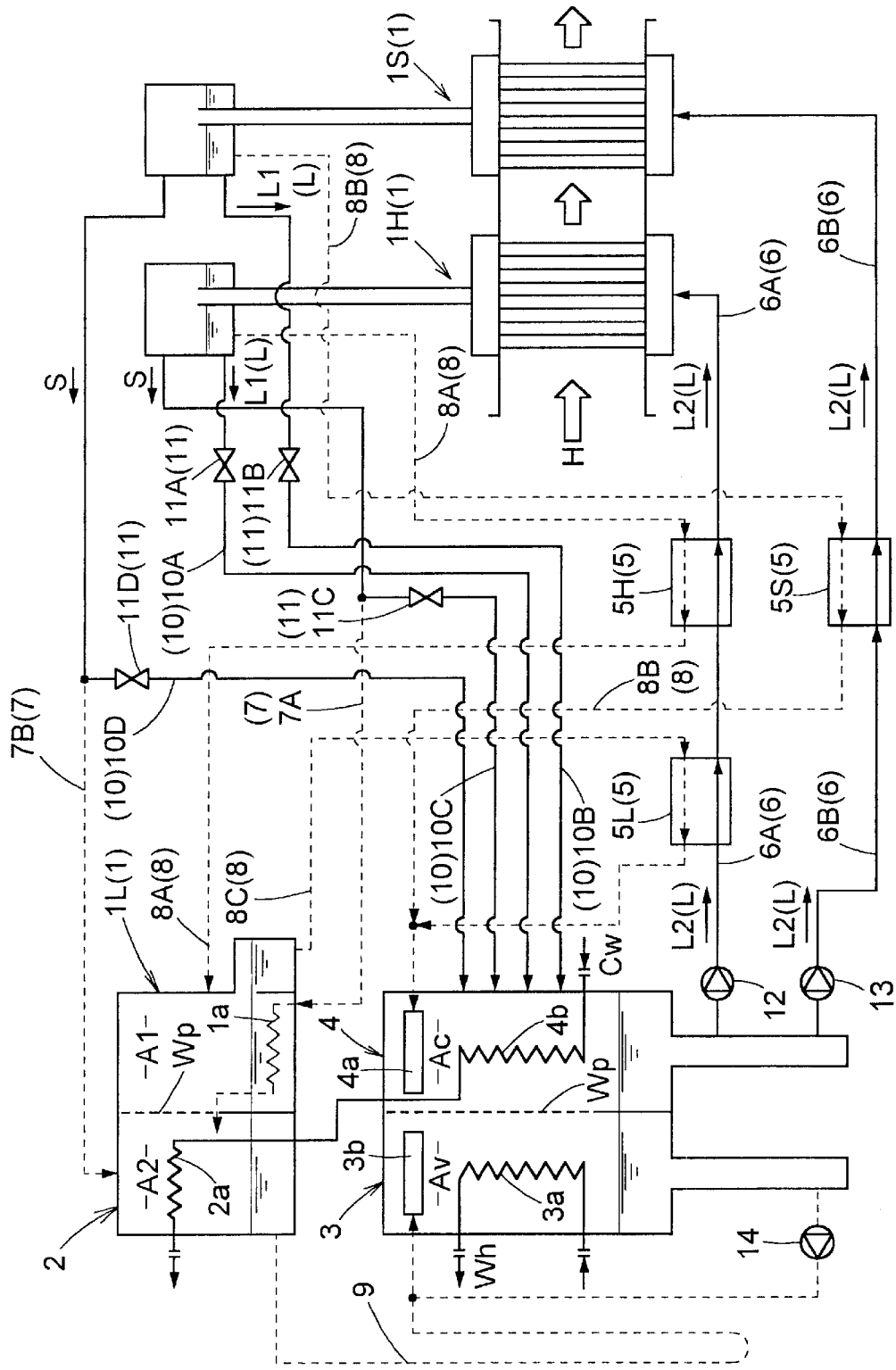
FIG. 2 is an explanatory view showing the absorption waste-heat recovery system shown in FIG. 1 under a different state thereof.

In addition to the above-described construction, as shown in FIG. 2 and also in FIG. 1, bypass passages 10 are provided for connecting the steam passages 7 from the high temperature generator 1H and the auxiliary generator 1S and the concentrated solution passages 8 from the high temperature generator 1H and the auxiliary generator 1S respectively to the absorber 4 via circuit closing means 11. More specifically, a first solution bypass passage 10A is connected to the absorber 4 as one of the bypass passages 10 provided for the first concentrated solution passage 8A for guiding the concentrated solution L1 concentrated at the high temperature generator 1H and a first solution passage bypass opening/closing valve 11A is incorporated in this first solution bypass passage 10A as one of the circuit closing means 11. A second solution bypass passage 10B is connected to the absorber 4 as another of the bypass passages 10 provided for the second concentrated solution passage 8B for guiding the concentrated solution L1 concentrated at the auxiliary generator 1S and a second solution passage bypass opening/closing valve 11B is incorporated in this second solution bypass passage 10B as another of the circuit closing means 11. Further, a first steam bypass passage 10C is connected between the first steam passage 7A and the absorber 4 as one of the bypass passages 10 provided for bypassing this first steam passage 7A and a first steam passage bypass opening/closing valve 11C is incorporated in this first steam bypass passage 10C as still another of the circuit closing means 11. And, a second steam bypass passage 10D is connected between the second steam passage 7B and the absorber 4 as still another of the bypass passages 10 for bypassing this second steam passage 7B and a second steam passage bypass opening/closing valve 11D is incorporated in this second steam bypass passage 10D as still another of the circuit closing means 11. There-above-described opening/closing valves 11A, 11B, 11C, 11D are fully opened when the system is to be operated for producing cold water.

With the above-described construction in operation, as shown in FIG. 2, when the circuit closing means 11, that is, all of the first solution passage bypass opening/closing valve 11A, the second solution passage bypass opening/closing valve 11B, the first steam passage bypass opening/closing valve 11C and the second steam passage bypass opening/closing valve 11D are opened so as to open up all of the first solution bypass passage 10A, the second solution bypass passage 10B, the first steam bypass passage 10C and the second steam bypass passage 10D, most of the steam S and the concentrated solution L1 will be allowed to circulate in these bypass passages 10. As a result, substantially all of the heat recovered by the high temperature generator 1H and the auxiliary generator 1S will be transferred to the absorber 4. Under this condition, if the supply of cooling water Cw to the cooling tube 4b of the absorber 4 is stopped, the above heat is supplied to the heat exchanger tube 3a mounted inside the evaporator 3 so that the water supplied in this heat exchanger tube 3a is heated and hot water Wh may be supplied from the exit of this heat exchanger tube 3a. That is to say, when the circuit closing means 11 is opened, the high temperature generator 1H and the auxiliary generator 1S function as a boiler and the evaporator 3 recovers the heat of the steam S and the heated concentrated solution L1 generated at the generators 1H, 1L.

That is to say, by closing the bypass passages 10 with manipulation of these circuit closing means 11, the system functions as a cold water producing system for producing cold water at the heat exchanger tube 3a of the evaporator 3 (see FIG. 1). On the other hand, by opening the bypass passages 10, the system functions as a hot water producing system for producing hot water at the heat exchanger tube 3a of the evaporator 3 (see FIG. 2). Referring to one example where the circuit closing means 11 is closed and absorbing liquid comprising water solution of lithium bromide as an absorbent as the liquid L, supposing that the heat medium fluid H has a temperature of 290° C. at the entrance to the high temperature generator 1H and a temperature of 110° C. at the exit of the auxiliary generator 1S, then, if cold water of 12.5° C. is circulated to the heat exchanger tube 3a of the evaporator 3, this water will have a temperature of 7° C. at the exit of this heat exchanger tube 3a. Further, referring to an example where the circuit closing means 11 is closed with the same conditions of the solution L and the heat medium fluid H as above, if hot water of 50° C. is circulated to the heat exchanger tube 3a of the evaporator 3, this water will have a temperature of 55° C. at the exit of the heat exchanger tube 3a.

Other Embodiments

Other embodiments of the absorption waste-heat recovery system relating to the present invention will be described next.

<1> In the foregoing embodiment, the system includes the auxiliary generator 1S, the condenser 2, the evaporator 3 and the absorber 4 and the single-effect cycle and the double-effect cycle are formed with sharing the condenser 2, the evaporator 3 and the absorber 4. Instead, the condenser 2 may be provided independently of the double-effect cycle. In this modified construction too, it is possible to avoid heat exchange between the single-effect cycle and the double-effect cycle in the passages extending to the evaporator 3.

<2> In the foregoing embodiment, the evaporator 3 and the absorber 4 are combined into a single assembly with the evaporating space Av of the evaporator 3 and the contact space Ac of the absorber 4 being partitioned from each other by means of the eliminator Wp and with all of the bypass passages 10 being connected to the absorber 4. Instead, all of the bypass passages 10 may be connected directly to the evaporator 3. For instance, all of the bypass passages 10 may be open into the evaporating space Av of the evaporator 3, or the two solution bypass passages 10A, 10B may be converged to the condensed water passage 9. In this case, a shower nozzle for discharging the concentrates solution L1 to the heat exchanger tube 3a may be provided separately from the shower nozzle 3b described in the foregoing embodiment. With such modified construction, the steams from the two steam bypass passages 10C, 10C will maintain the temperature inside the evaporating space Av so as to warm the heat-exchanger tube 3a mounted inside the evaporator 3, whereby the concentrated solution L1 from the concentrated water passage 9 will generate steam and its heat is transferred to the heat-exchanger tube 3a for improving the heat transfer efficiency to the hot water Wh. As another mode of connection, of the bypass passages 10, the two steam bypass passages 10C, 10D may be open into the evaporating space and the two solution bypass passages 10A, 10B may be connected to the contact space Ac of the absorber 4. In this case, like the above case, the steams from the two steam bypass passages 10C, 10D will maintain the temperature inside the evaporating space Av so as to warm the heat-exchanger tube 3a inside the evaporator 3. Whereas, the concentrated solutions L1 from the two solution bypass passages 10A, 10B will generate steam inside the contact space Ac and this steam will reach the evaporating space Av for warming the heat-exchanger tube 3a inside the evaporating space 3. Accordingly, even if the concentrated solutions L1 are not completely evaporated inside the contact space Ac and remain instead as liquid L, this liquid may be re-circulated into the system from the liquid sump formed at the lower region of the absorber 4.

Figure 3:
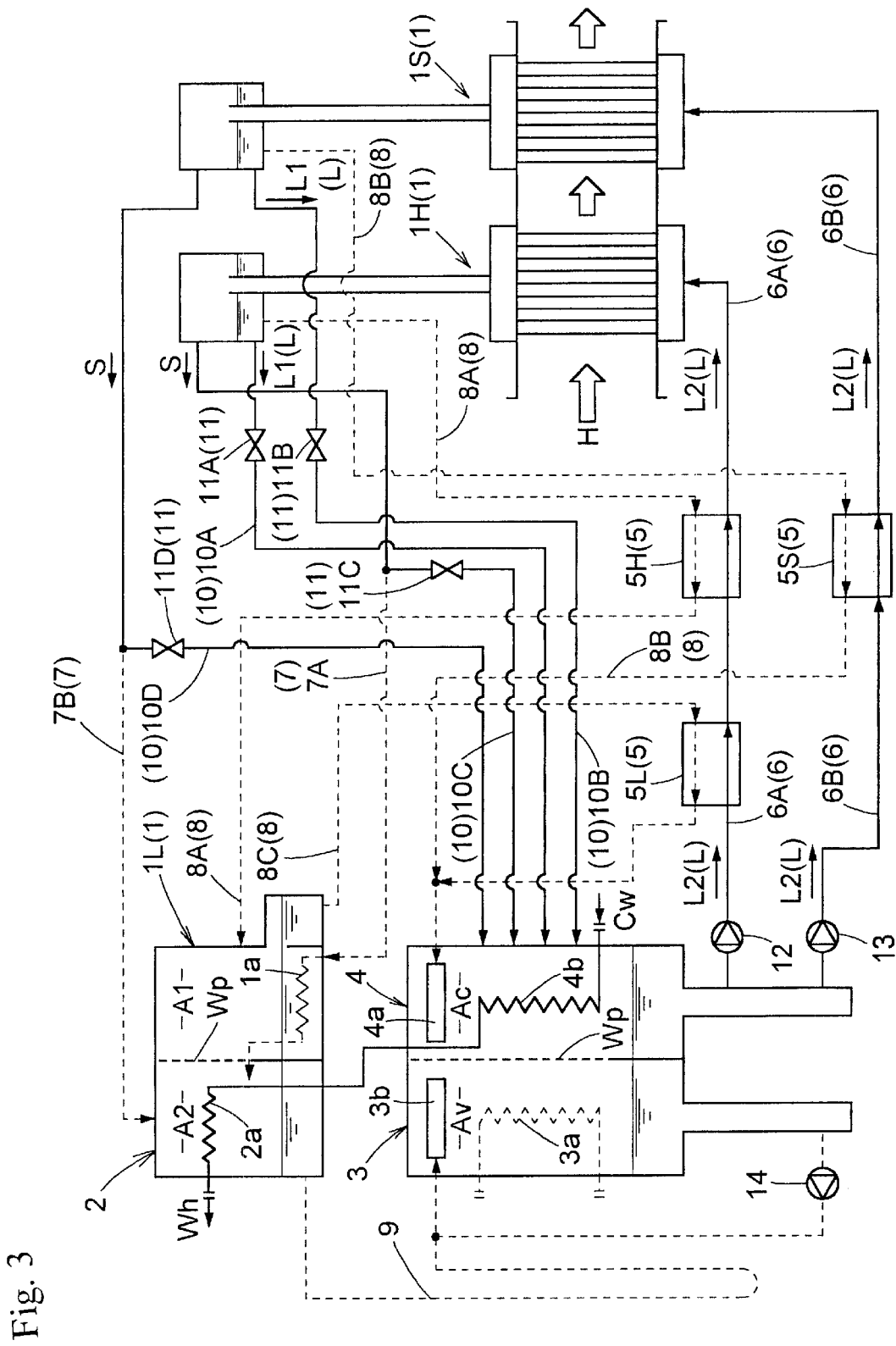
FIG. 3 is an explanatory view showing the absorption waste-heat recovery system shown in FIG. 1 under a still different state thereof.

<3> In the foregoing embodiment, by opening the bypass passages 10 with manipulation of the circuit closing means 11, hot water Wh is produced at the evaporator 3. Instead, the system may be constructed alternatively such that hot water Wh may be produced at the absorber 4. That is to say, in this case, the cooling tube 4b of the absorber 4 described in the foregoing embodiment will be constructed as a hot water producing tube 4b for producing hot water Wh as shown in FIG. 3 for example. This is possible by e.g. opening all of the bypass passages 10 into the contact space Ac of the absorber 4. As a result, the hot water producing tube 4b will be heated with the concentrated solution L1 and the steam S from the bypass passages 10. And, if hot water is circulated in the hot water producing tube 4b, further heated hot water Wh will be supplied from the hot water producing tube 4b. In this case, if the two solution bypass passages 10 are connected to the concentrated solution nozzle 4a, the concentrates solution L1 supplied thereto will generate steam inside the contact space Ac and this steam will come into contact with the hot water producing tube 4b, thereby to improve the heating efficiency of the hot water Wh.

<4> Such specific conditions described in the foregoing embodiments including the absorbent, the temperature of the heat medium fluid H, the temperature of the cold water Wc, the temperature of the hot water Wh are only examples. These may vary, depending on the operating condition, scale, construction, etc. of the system.

The present invention may be embodied in other form than described above. Various modifications and changes will be obvious to those skilled in the art without departing from the essential spirit of the invention. The disclosed embodiments are provided for the purpose of illustration of some specific examples only, not limiting the scope of the invention which scope is set forth in the appended claims.

What is claimed is:

1. An absorption waste-heat recovery system comprising:
    a high temperature generator for directly receiving a heat medium fluid containing waste heat for recovering heat therefrom and concentrating a solution having an absorbent dissolved therein and generating steam;
    a low temperature generator for re-concentrating the concentrated solution concentrated at the high temperature generator after reduction of its temperature by heat recovering means in the system by using the steam from the high temperature generator as heat source;
    an auxiliary generator for introducing the heat medium fluid after its heat recovery at the high temperature generator and again recovering heat therefrom;
    a condenser for condensing steam from the auxiliary generator and steam after the re-concentration of the concentrated solution at the low temperature generator;
    an evaporator for evaporating the condensed water condensed at the condenser; and an absorber for receiving the concentrated solution from the low temperature generator and the concentrated solution from the auxiliary generator and diluting these solutions by causing them to absorb the steam from the evaporator;

wherein a double-effect cycle using the high temperature generator and the low temperature generator and a single-effect cycle using the auxiliary generator share at least the evaporator and the absorber out of the condenser, the evaporator and the absorber.

2. The system according to claim 1, further comprising bypass passages for connecting a steam passage from the high temperature generator, a steam passage from the auxiliary generator, a concentrated solution passage from the high temperature generator and a concentrated solution passage from the auxiliary generator respectively via circuit closing means to the absorber, so that by opening the bypass passage with manipulation of the circuit closing means the absorber or the evaporator produces hot water.

* * * * *